INVENTORS
JAMES F. SHIVELY
ARMAND STAPRANS
BY John C Randa

INVENTORS
JAMES F. SHIVELY
ARMAND STAPRANS
BY John C. Randu

United States Patent Office 3,454,817
Patented July 8, 1969

3,454,817
COUPLED CAVITY HIGH-FREQUENCY ELECTRON DISCHARGE DEVICE WITH MEANS FOR REDUCING THE Q AT UNDESIRED REGIONS WITHOUT OVERLOADING THE Q IN THE OPERATING REGIONS
James F. Shively, Palo Alto, and Armand Staprans, Los Altos, Calif., assignors to Varian Associates, Palo Alto, Calif., a corporation of California
Filed Dec. 8, 1966, Ser. No. 600,195
Int. Cl. H01j 25/34
U.S. Cl. 315—3.5                   8 Claims

ABSTRACT OF THE DISCLOSURE

A microwave tube is disclosed. The tube includes an electron gun at one end thereof for forming and projecting a stream of electrons over an elongated beam path to a collector at the other end. A slow wave circuit is disposed along the beam path for electromagnetic interaction with the beam. The slow wave circuit includes a plurality of coupled cavities. A lossy loading means is coupled to the coupled cavity slow wave circuit for loading certain undesired modes of oscillation associated therewith. The loading means includes a terminated section of waveguide, preferably wrapped around in the peripheral direction in a concentric manner with the beam. The terminated waveguide sections are coupled to the coupled cavity slow wave circuit via suitable coupling irises and the terminating waveguides are tapered in the direction of power flow therein from a maximum height at the coupling iris to a minimum at the terminated end of the waveguide. The inner surfaces of the terminating waveguide, are coated with lossy attenuating material.

---

Figure 1:
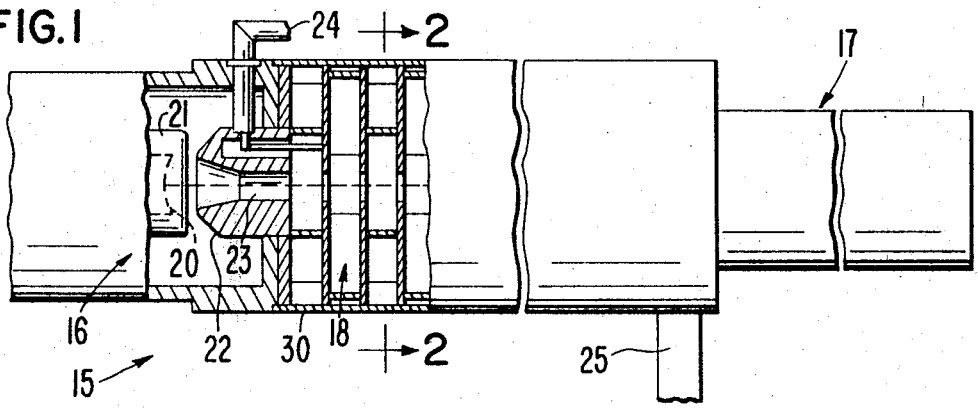

The state of the art high power coupled cavity slow-wave circuit which is particularly useful in generating multi-kilowatt average powers and multi-megawatt peak powers in traveling wave tubes which are of the conventional and hybrid types, e.g. (stagger tuned klystron input with travelling wave output) is the cloverleaf circuit which is characterized by the ability to handle high powers (as above indicated) at high frequencies (microwave spectrum) with good bandwidth (10%).

This invention is particularly directed to improving the circuit stability of travelling wave tube electron discharge devices of the conventional type or hybrid type by the incorporation of novel selective loading techniques. One particularly troublesome stability problem arises from what can be termed a resonant circuit type of beam-wave interaction at the π mode or band edge region of the operating mode associated with frequencies where the group velocity approaches zero. Oscillations can occur at this region in pulse operated tubes when the beam is pulsed on and off. Also drive induced oscillations may occur at the upper band edge of the fundamental mode when the tube is operated above saturation in order to take advantage of the rather flat power output characteristics of an overdriven tube. Other types of spurious oscillations which inhibit good stability of operation are oscillations at higher order modes. Energy losses to what can be termed the slot mode and the 5H mode are particularly troublesome at or near the respective π-points of these modes in the cloverleaf type of coupled cavity slow-wave interaction circuit. Means are disclosed by the present invention for reducing the circuit Q for the slot mode and 5H modes and thus correcting circuit stability problems associated with these modes and in particular with respect to resonant circuit oscillations due to π-point resonances.

A particularly effective mechanism for extracting energy over a broad frequency spectrum is a tapered E-plane waveguide load means which effectively evenly distributes the power distribution per unit length such that hot spots and destruction of the load means is obviated. By tapering a waveguide load coupled to a coupled cavity circuit and distributing lossy attenuating material over the interior walls as opposed to simply loading down the entire cavity with lossy material good even power loss over all frequencies above the upper operating point is achieved and the power is evenly distributed throughout the tapered waveguide load. By distributing lossy material in a ½ wavelength long waveguide, as determined at the frequency associated with the π-point or upper cut-off of the operating mode, rather surprisingly good results in reduction of the Q at the π-point resonance and at frequencies thereabove is achieved as taught by the present invention. Good selective loading of the slot mode can also be achieved by coating the slot defining walls with lossy attenuating material. Other E-plane tapered lossy load configurations are taught by the present invention, e.g., the side wall coupling approach is shown to have useful characteristics.

The most advantageous loading approach taught by the present invention is the aforementioned tapered E-plane ½ wavelength long guide which acts as a resonant cavity at frequencies at or around the band edge or π-point and as a non-resonant waveguide termination at higher frequencies.

It is therefore an object of the present invention to provide novel loading means for coupled cavity slow-wave circuits.

A feature of the present invention is the provision of a high-frequency electron discharge device having a coupled cavity slow-wave circuit provided with tapered lossy load means for extracting undesired electromagnetic wave energy therefrom.

Another feature of the present invention is the provision of a high-frequency electron discharge device having a coupled cavity slow-wave circuit provided with tapered lossy load means in the form of one or more ½ wavelength long waveguides as determined at the π-point or upper band edge of the operating mode which are tapered in the E-plane from a maximum at the coupling region to the slow-wave circuit to a minimum at the terminated end and having the internal surfaces thereof coated with a lossy attenuating material.

Another feature of the present invention is the provision of novel slot mode Q reduction means for high-frequency electron discharge devices incorporating a cloverleaf type slow-wave circuit.

Another feature of the present invention is the provision of novel higher order mode suppression means for cloverleaf types of slow-wave circuits.

Figure 2:
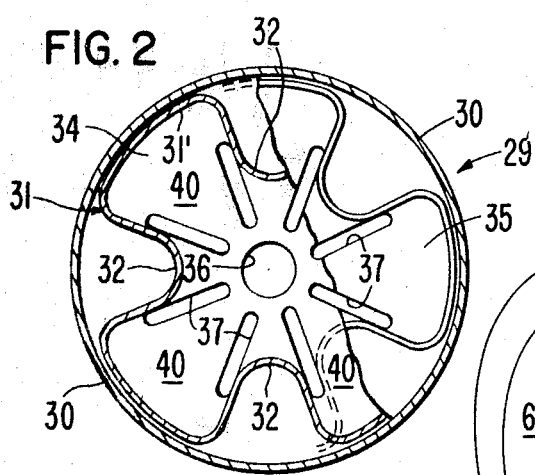
Figure 3:
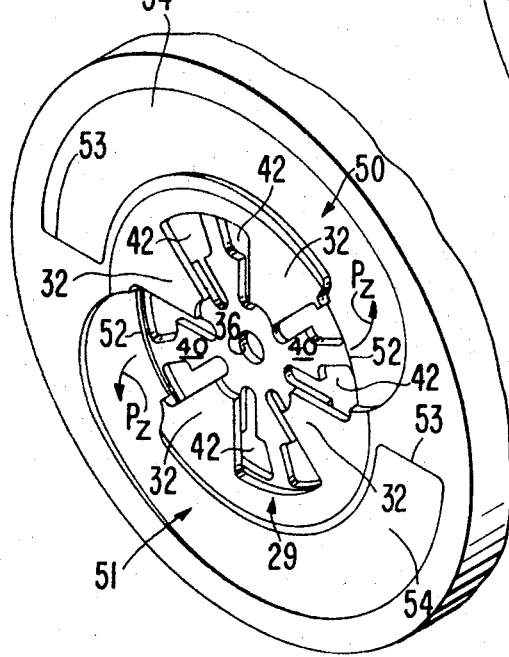
Figure 4:
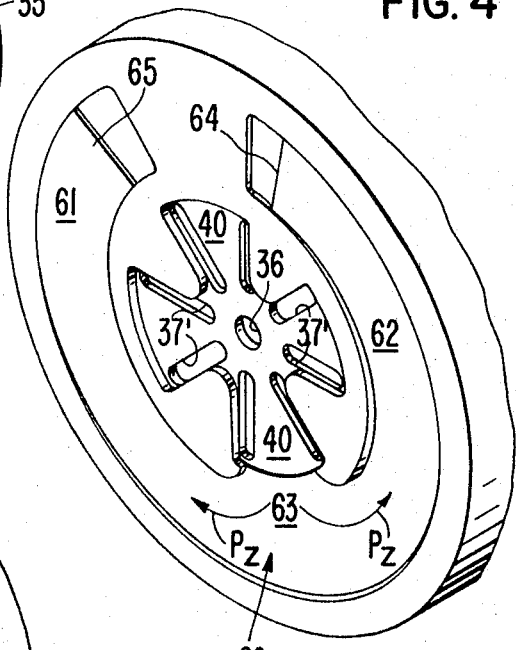
Figure 5:
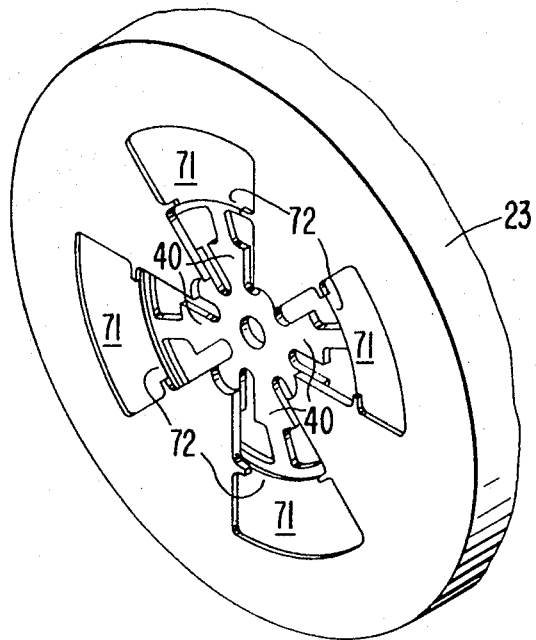
Figure 6:
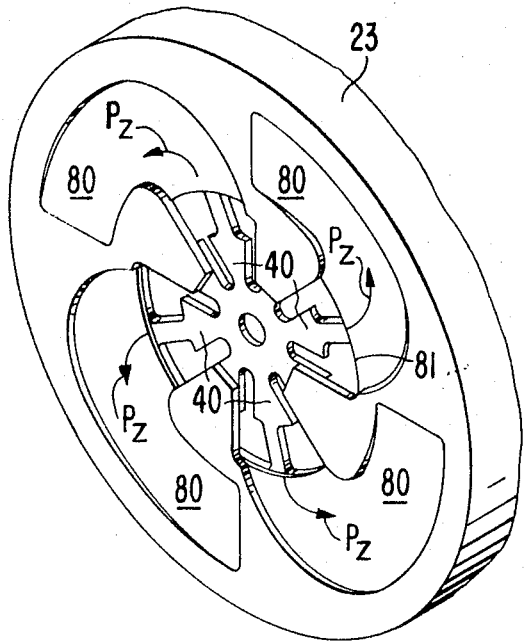
Figure 7:
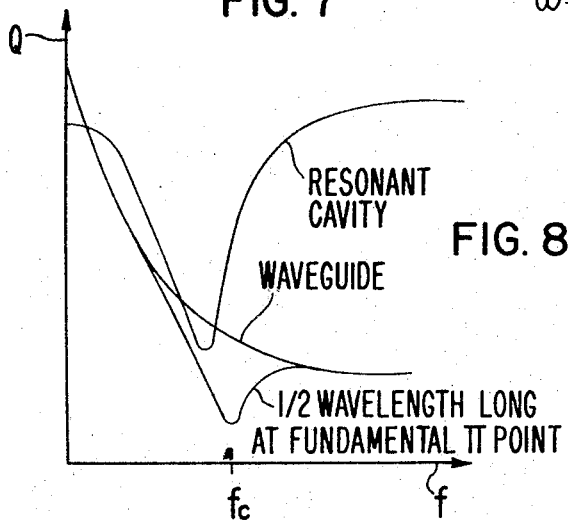
Figure 8:
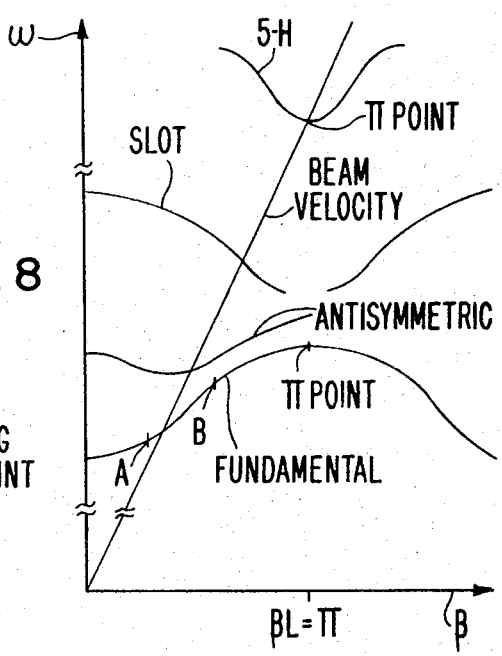
Figure 9:
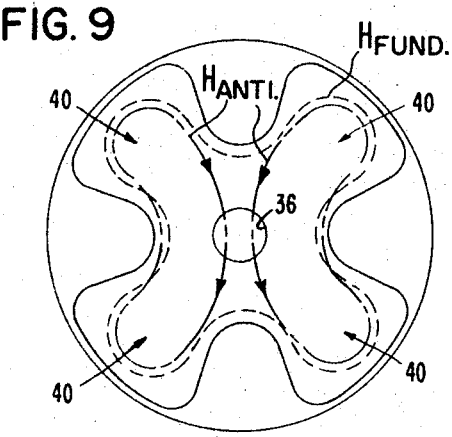
Figure 10:
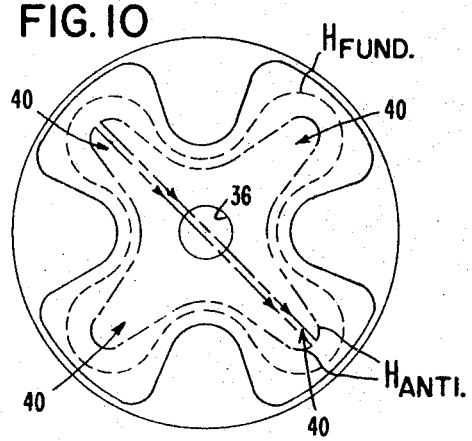
Figure 11:
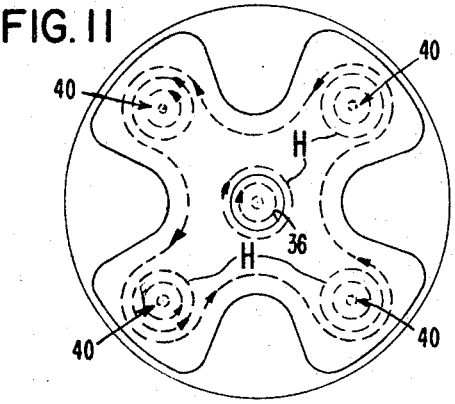

These and other features and advantages of the present invention will become more apparent upon a perusal of the following specification taken in connection with the accompanying drawings wherein, FIG. 1 is a fragmentary longitudinal view, partly cut-away, of a high-frequency electron discharge device of the coupled cavity type, FIG. 2 is a sectional view of a typical prior art cloverleaf type of slow-wave circuit cavity, FIG. 3 is a perspective view of a modified cloverleaf slow-wave circuit cavity section incorporating a pair of tapered E-plane terminated waveguide loads having lossy attenuating material distributed on the internal waveguide walls, FIG. 4 is a perspective view of a modified cloverleaf slow-wave circuit cavity section incorporating a novel sidewall feed tapered E-plane waveguide load means, FIG. 5 is a perspective view of a modified cloverleaf slow-wave circuit cavity section incorporating iris coupled lossy resonant cavity loading for the leaf portions, FIG. 6 is a perspective view of a modified cloverleaf slow-wave circuit cavity section incorporating tapered ½ wavelength resonant terminated waveguide loads coated with lossy attenuating material, FIG. 7 is an illustrative graphical portrayal of circuit Q vs. frequency for different load mechanisms, FIG. 8 is an $\omega$–$\beta$ diagram for a cloverleaf type of slow-wave circuit, FIGS. 9 and 10 are sectional views of a typical cloverleaf cavity showing the magnetic field patterns for the fundamental and anti-symmetric modes, and FIG. 11 is a sectional view of a typical cloverleaf cavity showing the H-field configuration for the 5–H and slot modes.

Turning now to FIG. 1 there is shown a high frequency electron discharge device 15 incorporating a coupled cavity slow-wave circuit of the cloverleaf type. The device 15 is representative of both the conventional and hybrid types although particularly directed to the former. See, for example, U.S. Pat. No. 3,233,139 by M. Chodorow and U.S. patent application Ser. No. 334,496, filed Dec. 30, 1963, now issued as U.S. Patent 3,289,032 on Nov. 29, 1966, by R. Rubert et al., both of which are assigned to the same assignee as the present invention, for examples of coupled cavity travelling wave high frequency electron discharge devices of the conventional type and hybrid types incorporating cloverleaf slow-wave circuit sections. Briefly, the device 15 includes an electron beam forming and projecting means 16 disposed at the upstream end portion of the device and electron beam collector means 17 disposed at the downstream end portion of the device. Intermediate the upstream and downstream end portions a coupled cavity slow-wave circuit portion 18 of the cloverleaf type is disposed to provide a beamwave interaction mechanism in a manner well known in the art. The beam forming and projecting means 16 includes a conventional Pierce-type gun with cathode emission surface 20, focusing electrode 21 and accelerating anode 22 as shown. The gun region is isolated from the circuit region via drift tube region 23 and the shell 30 forms an evacuated enclosure for the device. Input coax coupler 24 or a waveguide or other conventional coupler means feeds RF energy to be amplified to the input region of the circuit 18 and amplified RF energy is extracted via any conventional coupling mechanism, e.g., waveguide 25. It is to be understood that the input section of the circuit 18 may be a klystron section for hybrid operation, e.g., as taught in the aforecited co-pending U.S. Ser. No. 334,496.

Turning now to FIG. 2 there is depicted a typical prior art cloverleaf cavity section 29 disposed in a shell 30 which includes a sinuous four element sidewall portion 31 including the four 90° space rotated finger or nose sections 32, slotted end wall plates 34, 35 having a central beam coupling aperture 36, 8 radially oriented coupling slots 37 provide wave coupling between adjacent cavities. Adjacent cavities are space rotated 45° relative to each other and provide negative mutual inductive coupling and good forward wave fundamental bandwidth in a manner well known in the art. A portion of sinuous side wall 31 for the next cavity section illustrates this as shown in FIG. 2. The cloverleaf cavity thus defines the four leaf sections 40 defined as above.

It is to be noted that the terminology cloverleaf is not to be restricted to a four leaf or finger embodiment since 2, 6, 8, 10, etc. finger cloverleaf circuits are within the confines of the teachings of the present invention. The same mode problems exist in cloverleaf circuits which deviate from the four leaf type. For example, in a six leaf circuit the 5H mode would now be the 7H mode and the slot mode would still be a problem. In a eight leaf circuit the 5H mode would be the 9H mode and again the slot mode would be a problem. The anti-symmetric mode problems would remain and the solutions taught by the present invention would still be applicable.

Attempts to increase the operating average power level of the cloverleaf circuit have led to the T-shaped slots 42 as depicted in FIG. 3. These T-shaped slots permit good frequency separation between the bottom of the lowest anti-symmetric mode and the upper band edge of the fundamental mode and permit moving the slots radially outward as well as using end wall plate thicknesses of 20 to 30% of the periodic length for high average power operation while still maintaining good interaction impedance and bandwidth. Further discussion of the T-shaped slots is presented in co-pending U.S. patent application Ser. No. 600,194 filed Dec. 8, 1966 by B. Arfin et al., and assigned to the same assignee as the present invention. It is to be understood that the terminology cloverleaf slow-wave circuit is generic to conventional as well as modified coupling slots in the defining cavity end walls as well as to two, four, six, eight, etc. leaf circuits. Before proceeding to a discussion of the particular loading mechanisms depicted in the embodiments of FIGS. 3–6, a discussion of the stability problems encountered in cloverleaf coupled cavity slow-wave circuits referenced to FIGS. 8–11 will be presented.

In FIG. 8 an illustrative $\omega$–$\beta$ plot of a typical cloverleaf circuit is depicted. The curve labeled fundamental is the desired forward wave fundamental space harmonic where cloverleaf circuits are typically operated within the operating band region defined by lines labeled A, B. As discussed previously circuit stability problems are encountered at the $\pi$-point or upper band edge region of the fundamental mode and at higher order modes such as the 5H and slot modes as indicated by the labeled curves. If the circuit has high Q for these modes oscillation problems, especially for low beam impedances, become troublesome to a degree where stabilization becomes mandatory.

The mode patterns labeled H-anti and H-fund in FIGS. 9 and 10 are illustrative of the H field configurations of the fundamental operating mode, a perturbed $TM_{01}$ cavity mode and the two anti-symmetric mode patterns which exist in adjacent cavities due to 45° relative rotation between cavities as discussed previously. These modes are the variations of the lowest anti-symmetric mode which is a perturbed $TM_{11}$ cavity mode. Both the kidney and sombrero FIGS. 9 and 10 are the same lowest anti-symmetric mode; the pattern simply shifts from cavity to cavity due to 45° rotation. In FIG. 11 the H-field mode patterns for the slot mode and 5–H modes are depicted. The 5–H mode is a perturbed $TM_{02}$ cavity mode. The H-field patterns for the 5–H mode are maximum at the center beam coupling aperture 36 and in the leaf regions 40 as shown. The E-field patterns for the slot and 5–H modes are of different amplitudes and thus permit distinguishing between the two modes. The fundamental, lowest anti-symmetric and 5–H modes are cavity modes and occur whether coupling slots are present or not. The lowest slot mode on the other hand occurs when the slots are a half wavelength long and occurs only when there are slots. When the slots are resonant, there is an electric field maximum across the width of the slot. This electric field must be encircled by magnetic field lines giving rise to a rather complicated field pattern which in some respects resembles the 5–H mode but is not identical. In any case, there are strong wall currents circulating in the defining walls of the slots for the slot mode giving rise to good loading when Kanthal or other loading material is applied in this region. The above general discussion is provided merely to illustrate the problems inherent in coupled cavity slow-wave circuits due to interaction with modes above the operating band and at the band edge of the operating mode.

The present invention is particularly concerned with novel means for loading down these modes or reducing their Q without appreciable loading down of the fundamental operating region, or what can be termed the non-$\pi$ point region of the fundamental operating band. Previous attempts have led to the concepts of utilizing terminated lossy resonant cavities, lossy resonant loops, and terminated lossy waveguides. None of the above solutions has been found completely satisfactory due to deficiencies such as formation of hot spots in carbonized ceramic loaded cavities or waveguides and consequent destruction of the loads due to burn up, insufficient loading of all the troublesome regions such as π-point and all higher frequencies, overloading of fundamental and underloading of undesirable modes.

Turning now to FIG. 3 a section of a cloverleaf cavity 29 modified with T-shaped slots 42 is depicted with a pair of tapered E-plane terminated arcuate waveguide loads 50, 51 coupled to diametrically opposed leaf portions 40 of the cavity 29 at the guide end portions. The waveguides 50, 51 were designed to have a cutoff frequency between the upper edge of the operating band and the π-point of the fundamental operating mode and were tapered from maximum height at the coupling iris region 52 to zero height at the terminated ends. The inner waveguide surfaces were coated with a lossy attenuating material 54 for absorbing RF energy within the above defined limits which means at frequencies higher than the upper edge of the operating band. A suitable loading material is Kanthal A, an iron, chromium, aluminum, cobalt composition made by the Kanthal Corp. Any other lossy attenuating materials which can handle the specific power levels for a given application may be selected without the exercise of invention. Different types of coupling between the leaf and waveguides such as a capacitive post tuned to the fundamental π-point resonance, resonant and non-resonant irises were tried and the best results were obtained with simple non-resonant coupling as shown in FIG. 3 wherein the waveguide 50 is directly coupled to the leaf. The loading effects of this arrangement using a pair of independent terminated waveguide loads are set forth in Table I. It is to be noted that each cloverleaf section 29 can be machined out of an integral metal plate, e.g., copper or made in sections as desired.

In FIG. 4 a modified sidewall coupled tapered waveguide load arrangement is depicted which incorporates a single arcuate concentric waveguide 60 coupled to cut-out endwall of leaf 40. The waveguide 60 is divided into two sections 61, 62 each of which is provided with E-plane tapering from a maximum height at the coupling region 63 to a minimum at the terminated ends 64, 65. Again the internal waveguide surfaces are coated with a lossy attenuating material. The waveguide is again dimensioned to have a cut-off frequency above the upper edge of the operating frequency range and below the π-point. The results on the various modes with respect to the effective loading achieved by this configuration are given in Table I.

In FIG. 5 a cloverleaf cavity loaded by 4 resonant cavities 71 coupled to cavity leaf portions 40 via iris means 72 are shown. The cavities are disposed within the evacuated housing shell portion 23 and are coated with a lossy attenuating material as discussed previously. The cavities were designed for resonance at the π-point region of the fundamental. The results are tabulated in Table I showing the Q reduction for various modes and resonance points.

In FIG. 6 the optimized design evolved incorporates 4 arcuate waveguides 80 coupled to the leaves 40 through cut-outs at 81 as indicated. The waveguides 80 were designed to be ½ electrical wavelength long at a frequency substantially at the π-point or upper band edge of the fundamental operating mode and thus functioned as a resonated waveguide which heavily loads the π-point via a resonance mechanism and all frequencies above the π-point via a lossy waveguide mechanism. Once again the waveguides 80 are tapered along the direction of power flow as indicated by arrows $P_Z$ in the E-plane from a maximum at the power input region to a minimum at the terminated end. Good results are obtained by tapering from full height to zero. The internal waveguide walls are again coated with a lossy attenuating material as discussed previously. The loading effects are depicted in Table I. It is seen that good loading at all desired points 5–H(-π-point) fundamental π-point and lowest slot mode frequency is achieved. The Q for the 5–H mode π-point was too low to be measured.

The absorbing (Q-reduction) or loading effects for the three types, resonant, waveguide and ½ wavelength waveguide over a range of frequencies is depicted in FIG. 7. The advantage of the ½ wavelength long waveguides determined at the π-point of the fundamental mode is clearly evident and is seen that exceptional results are obtained with the embodiment of FIG. 6. The tapered E-plane provides an excellent means for evenly distributing the power absorption over the internal walls of the waveguides and has minimized hot spot problems as previously discussed.

TABLE I.—COMPARISON OF LOADING SCHEMES

| Type of loading | Fundamental pi-point Q | Lowest frequency slot mode Q | 5–H mode pi-point Q |
|---|---|---|---|
| Straight waveguide loads (two coupling slots). Not pictured | 140 | 49 | 17 |
| Curved waveguide loads (two coupling slots) (Fig. 3) | 120 | 125 | 18 |
| Opposing waveguide loads (one coupling slot) (Fig. 4) | 194 | 96 | 270 |
| Four lossy cavities | 16 | 270 | 62 |
| Resonant at fundamental pi-point (Fig. 5) (resonant at slot mode) | (470) | (19) | (—) |
| Curved waveguides (four coupling slots) (Fig. 6) | 26 | 163 | Very low |

In Table II loading results for coating the slot defining surfaces, e.g., 37 for a conventional slot are given. The loading effects for coating the peripheral cloverleaf cavity sidewalls 31' with lossy attenuating material and for coating both slot and cavity surfaces together are given in Table II. Kanthal A material was used. The T-shaped slots may also advantageously have their defining walls coated with lossy attenuating material for slot mode reduction.

TABLE II.—SUMMARY OF Q'S FOR LOSS INSIDE CLOVERLEAF

| Resonance | Loss configuration | | | |
|---|---|---|---|---|
| | None | Slots | Slots and periphery | All |
| Average non-pi-fundamental | 1,291 | 260 | 160 | 61 |
| Fundamental pi | 1,229 | 410 | 176 | 82 |
| Lowest slot | 2,150 | 144 | 93 | 68 |
| Average other slot | 2,225 | 438 | 194 | 63 |
| 5–H pi | 3,011 | 542 | 292 | 117 |
| Other 5–H | 2,816 | 542 | 327 | 133 |

It is seen that coated cavity and coated slot approaches are not as effective as the tapered lossy waveguide approaches discussed previously. With the tapered E-plane lossy waveguide load approaches the reduction in the Q of the fundamental mode within the operating range is just such that no additional loss need be added within the cloverleaf itself to prevent regenerative in-band oscillations. This has the advantage that the heating due to the loss is in a region that is easily cooled. In other words, the tapered E-plane at ½ wavelength is the optimum solution for providing just enough in-band loading to prevent regenerative oscillation while adequately loading down higher order modes. A further improvement is achieved by also using lossy coating on the slots to help reduce the Q for the slot mode without adversely lowering the Q for the fundamental non-π points.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A high-frequency electron discharge device of the velocity modulation type including a coupled cavity type of slow-wave circuit disposed along the device axis, means for generating and directing an electron beam along the device axis disposed at the upstream end portion thereof, beam collector means disposed at the downstream end portion of said device, lossy loading means coupled to said coupled cavity slow-wave circuit for extracting electromagnetic energy therefrom, said lossy loading means including a terminated waveguide with inside dimensions tapered in the E-plane with a decreasing E-plane dimension taken along the direction of power flow in said waveguide for energy coupled from said slow-wave circuit, and said terminated waveguide having the internal surfaces thereof coated with lossy attenuating material.

2. The device defined in claim 1 wherein said tapered terminated waveguide is designed to have a cut-off frequency between the upper edge of the operating band and the $\pi$-point band edge region of the operating mode of the coupled cavity slow-wave circuit of the device.

3. The device defined in claim 1 wherein said terminated waveguide has a length dimension in the direction of power flow selected to be ½ electrical wavelength long at a frequency corresponding to the $\pi$-point of the operating mode of the device.

4. The device defined in claim 1 wherein said coupled cavity slow-wave circuit is a cloverleaf type and said terminated tapered waveguide is coupled to the cavity leaf end walls and wherein said tapered waveguide is arcuate.

5. The device defined in claim 1 wherein said tapered terminated waveguide includes a pair of waveguide sections concentrically disposed about the device beam axis and coupled to said slow-wave circuit via a sidewall, said waveguide sections having maximum height dimensions at the input coupling region and minimum height dimensions at the terminated end regions.

6. The device defined in claim 1 wherein said tapered terminated waveguide is full height at the input coupling region and substantially zero height at the terminated end region.

7. The high-frequency electron discharge device defined in claim 1 wherein said coupled cavity slow-wave circuit is of a cloverleaf type and wherein the adjacent cavities are intercoupled via a plurality of radially directed azimuthally spaced elongated coupling slots, said coupling slots being provided with a lossy attenuating coating on the defining surfaces thereof for reducing the slot mode Q of said circuit.

8. A high-frequency electron discharge device of the velocity modulation type including a cloverleaf type of coupled cavity slow-wave circuit disposed along a central beam axis of said device, means disposed at an upstream end portion of said device for generating and directing an electron beam along the device axis through beam coupling apertures in the end walls of each of said cloverleaf cavity sections, means for collecting said beam disposed at a downstream end portion of said device, said cloverleaf type of coupled cavity slow-wave circuit having the cavity leaf peripheral portions cut-away to provide a plurality of circumferentially spaced peripheral openings in the leaf portions, each of said openings having a terminated waveguide coupled thereto, said waveguides being tapered in the direction of power flow from a maximum at the opening to a minimum at the terminated end, said waveguides being arcuate and having their inner surfaces coated with lossy attenuating material, said waveguides having a cut-off frequency lying above the upper edge frequency of the operating band of the device and below the $\pi$-point frequency of the operating mode of the device.

References Cited

UNITED STATES PATENTS

| 2,785,381 | 3/1957 | Brown. | |
|---|---|---|---|
| 3,010,088 | 11/1961 | Kahn. | |
| 3,221,204 | 11/1965 | Hant et al. | 315—3.5 |
| 3,221,205 | 11/1965 | Sensiper | 315—3.5 |
| 3,354,346 | 11/1967 | Lavik | 315—3.5 |
| 3,360,679 | 12/1967 | Rubert | 315—3.5 |
| 3,365,607 | 1/1968 | Ruetz et al. | 315—3.5 |

HERMAN K. SAALBACH, *Primary Examiner.*

S. CHATMON, JR., *Assistant Examiner.*

U.S. Cl. X.R.

315—39.3; 333—22, 31, 81, 98